United States Patent
Baker et al.

[11] 3,858,402
[45] Jan. 7, 1975

[54] OIL STORAGE TERMINALS

[75] Inventors: Rowland Baker, Somerset; Gordon Norton, Epping, both of England

[73] Assignee: The Balaeva Group Limited (formerly Seaward Structures International), Cambridge, England

[22] Filed: Jan. 17, 1973

[21] Appl. No.: 324,303

[30] Foreign Application Priority Data
Jan. 18, 1972  Great Britain............... 2294/72

[52] U.S. Cl................ 61/46.5, 114/.5 T, 220/18
[51] Int. Cl..................... B65g 5/00, B63b 35/00
[58] Field of Search............. 61/46.5, 46; 114/.5 T; 220/18, 20

[56] References Cited
UNITED STATES PATENTS

| | | | |
|---|---|---|---|
| 2,187,871 | 1/1940 | Voorhees | 61/46.5 X |
| 3,535,884 | 10/1970 | Chaney | 61/46.5 |
| 3,541,588 | 11/1970 | Ragland | 114/.5 T |
| 3,592,155 | 7/1971 | Rosenberg | 114/.5 T |
| 3,667,240 | 6/1972 | Vilain | 61/46.5 |
| 3,708,987 | 1/1973 | Roulet | 61/46 |
| 3,720,066 | 3/1973 | Vilain | 61/46.5 |

FOREIGN PATENTS OR APPLICATIONS
1,233,422   5/1971   Great Britain .................. 114/.5 T Primary Examiner—Jacob Shapiro
Attorney, Agent, or Firm—Brisebois & Kruger

[57] ABSTRACT

A method of and terminal structure for oil storage at sea are characterised in that the structure is constructed as an elongated closed vessel, internally subdivided into separate compartments which have flooding valves enabling the structure to float like a ship for towing to its site of use, and then to be flooded sequentially with sea water to cause the vessel to tip to a vertical attitude and settle on the sea bed, being grounded by its own weight. Oil is stored in the compartments with concomitant displacement of sea water, and the vessel can be exhausted of liquid and refloated for removal if desired.

6 Claims, 5 Drawing Figures

Patented Jan. 7, 1975

OIL STORAGE TERMINALS

This invention relates to oil storage or other terminals, for use at sea or in other deep water.

Off-shore oil storage facilities as hitherto proposed have taken the form of floating containers, or of structures which must be firmly anchored to the sea bed. The first are of limited use and application, because of relatively large surface area they consume and their tendency to drift, so that they can generally be employed only in sheltered waters. Storage containers of the second type are very expensive to construct and anchor to the sea bed and have the further disadvantage that they are, for practical purposes, only usable at the site on which they are erected.

The present invention however provides a terminal constructed as a floating vessel, which can be sunk and grounded in a controlled manner to provide a stable grounded structure and which can, if desired, subsequently be refloated and repositioned at another site.

The invention provides a method of oil storage in which a storage terminal in the form of a closed vessel is floated in its empty condition and towed to a site, flooded to cause it to sink and ground, and then filled or partially filled with oil, with concomitant displacement of water, the vessel remaining grounded by virtue of its own weight and ballast.

More particularly, the invention provides an oil storage or similar terminal for use at sea in the form of an elongated closed vessel subdivided by internal bulkheads into a plurality of separate compartments and provided with flooding and venting valves for the controlled flooding of different compartments in sequence, the arrangement being such that the vessel can be floated in a generally horizontal attitude for towing, and flooded to a generally vertical attitude for grounding in the vertical attitude, to form a free standing storage vessel resting on the sea bed under its own weight and ballast.

Trials have shown that a storage terminal of this form is extremely stable, although effectively grounded only by its own weight. The vessel is designed from the point of view of strength, as a ship in its horizontal, floating condition and when grounded and flooded as if it were a land structure bearing only its own weight. Side effects from wave and wind are, for practical purposes, negligible, due largerly to the fact that the bulk of the grounded structure is submerged, and thus serves as a stable support for the upper portion. The effect of surface waves on such a structure is minimal due in large measure to the very brief duration of wave pressure on one side of the structure and the pressure acting on the opposite side of the structure.

The structure is of a monolithic or rigid nature, thereby avoiding the complications due to cycle stressing in equivalent jointed structures and the structure walls are protected against stesses due to hydrostatic effects by virtue of the fact that the interior is freely flooded, so that the head of water, oil and water, or oil inside the vessel is counterbalanced by the head of water in which the vessel is partially submerged.

The structure is preferably of square, or other rectangular cross-section, which greatly simplifies construction, and in particular avoids the difficulties peculiar to the fabrication of large vessels of circular cross-section.

The substantial ballasting effect of the structure also makes it possible to dispense with any form of anchorage to the sea-bed, such as mooring or piling, thus further reducing the cost of construction and installation.

It is of course a major advantage to be able to refloat the structure, for the purpose of moving it to a new site or removing it for destruction at the end of its useful life, so that the defunct structure neither presents a hazard to shipping nor involves expensive demolition on site.

The invention also includes a novel method of oil storage at sea, based on the use of such a terminal, in which the vessel is floated in a generally horizontal attitude and towed to its site; the vessel is then flooded with sea-water by sequential operation of the said valves and thus lifted to a to a generally vertical attitude; the vessel is then further flooded to cause it to sink and settle on the sea bed in its vertical attitude; and the vessel is filled or partially filled with oil with concomitant displacement of sea-water from the interior of the vessel, the vessel remaining grounded by virtue of its own weight and ballast.

Further features and advantages of the invention will appear from the following description, given by way of example, of some embodiments thereof, illustrated in the accompanying drawings, in which.

Figure 1:
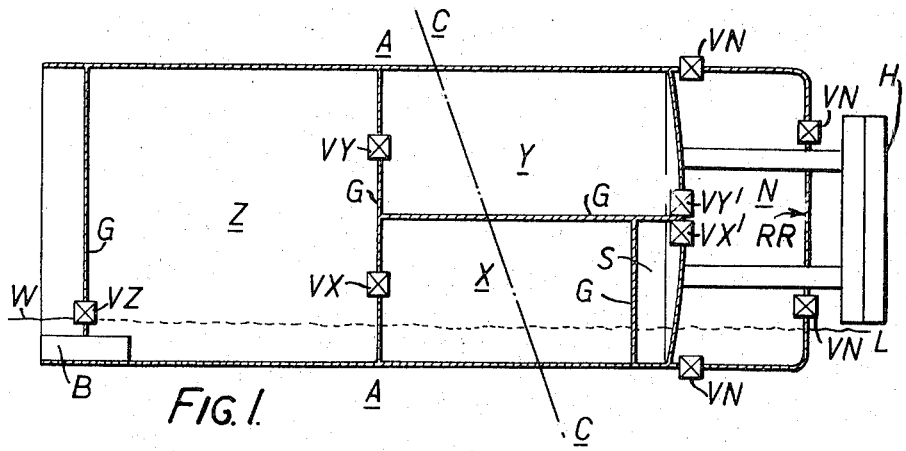
FIGS. 1 and 2 are diagrammatic sectional views of one form of terminal structure in its horizontal and vertical attitudes, respectively.

The terminal structure shown in the drawings takes the form of a square or other rectangular cross-section vessel 1 divided by internal transverse and longitudinal bulkheads G to form a plurality of separate compartments Z, Y, X, S and N, having associated therewith separate flooding and vent valves VZ, YY, VX, VX' VY' and VN.

In the preferred embodiment illustrated, the compartment Z at one end of the vessel (hereinafter referred to for convenience as "the after end") occupies the full cross-section of the vessel and some 40–50 percent of the axial length of the vessel. Compartment Y is of equivalent length but occupies only one half of the vessels cross-section and compartments X and S are together equivalent in volume to compartment Y. The remaining compartment N at the forward end occupies the full cross-section of the vessel.

Mounted at the forward end of the vessel is a superstructure comprising a working platform RR, accommodation block M and a helicopter platform H.

The vessel is trimmed at the after end by ballast B, located wholly on one side wall of the vessel so that it will float with that side lowermost.

In use, the vessel containing only air and with all valves closed, is towed to its proposed site and sunk in a controlled manner by sequential flooding of some of the internal compartments.

First, the flood valve VZ is opened to flood compartment Z, under the control of flooding and venting valve VY, and venting valve VY'. With the compartment Z completely flooded, the vessel settles to a waterline as indicated at CC.

Figure 2:
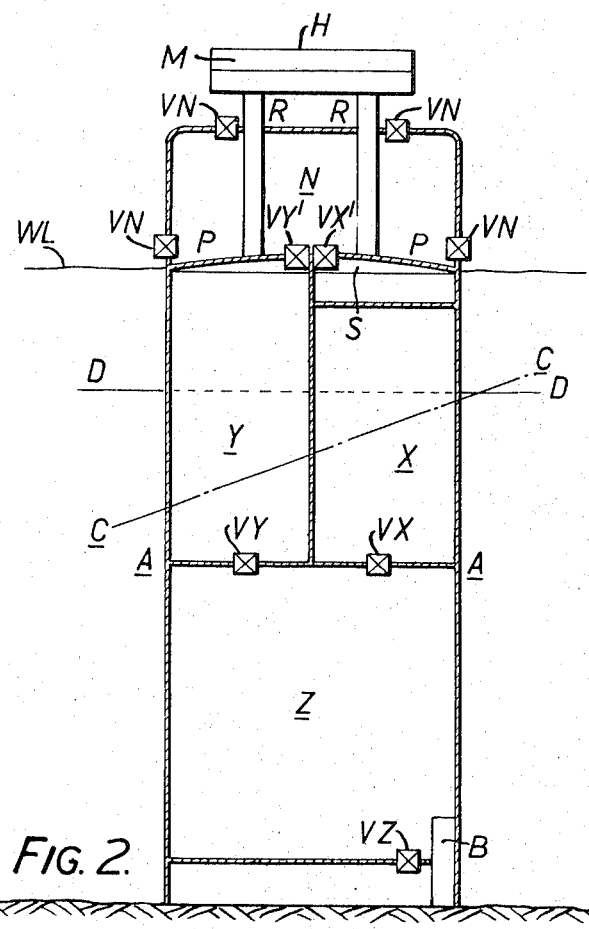

Next, the compartment Y is flooded (if necessary with initial flooding through vent valve VY') to counter the ballast B and bring the vessel to the vertical attitude shown in FIG. 2, settling at a water line as indicated at DD.

Finally, flooding is completed through valve VY to compartment Y and through valve VX to compartment X, under the control of vent valves VY' and VX', the latter being connected by trunking or piping to compartment F. The compartment S is not flooded, but acts as a sealed buoyancy tank to counterbalance the healing effect of the ballast B. The vessel will now be grounded by its total weight ex-ballast, with the final water level at WL as shown in FIG. 2, or flooding freely through compartment N, which serves primarily as a convenient termination of the vessel in the towing condition, and also to protect stanchions or other support structure for the accommodation block and for other equipment or fittings which it may house. Free flooding through the open valves VN serves to minimise the effects of variable buoyancy caused by wave action.

The vessel is now ready for charging with oil by displacement of water from X, Y and Z through the open valves VZ, VX and VY.

When desired, the vessel is emptied by pumping or blowing out the compartments in the reverse order to that described above, so as to be re-floated for towing away, for example to another site.

For the purposes of example only, the following dimensions and weights are suitable for a grounded terminal for use at depths of between 250 and 300 feet.

Steel structural weights (exballast) 7000T.

| | |
|---|---|
| Ballast 2000T. | |
| Overall length (less superstructure) | 340 ft. |
| Height of superstructure | 40 ft. |
| Cross-section of vessel | 100 ft. sq. |
| Length of compartment Z | 140 ft. |
| Length of compartment Y (measured at side wall of vessel) | 140 ft. |
| Draught empty at waterline WL | 10 ft. |
| Draught at waterline DD with Z fully flooded and Y flooded to about 25ft | 200 ft. |

The vessel should be stressed as a ship of equivalent size for floating, and as a structure bearing only its own weight when grounded, due account being taken of wave and weather loadings and tidal effects.

The vessel may be constructed of reinforced concrete but is preferably of welded steel plate, internally reinforced by T section joists extending both longitudinally and laterally of the vessel.

Figure 3:
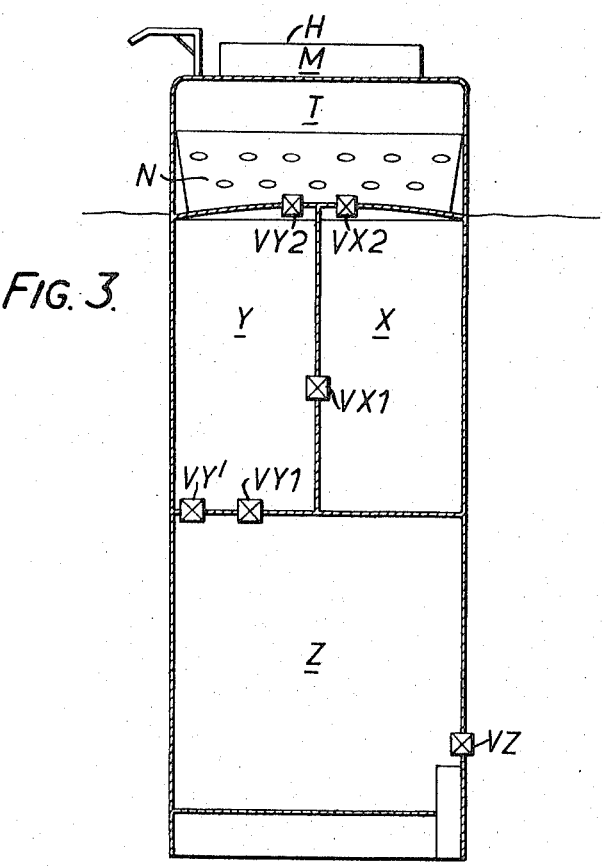
FIG. 3 is a view, similar to FIG. 2 of second form of terminal.

The terminal structure shown in FIg. 3 is generally similar to that of FIGS. 1 and 2, but omits the buoyancy tank 5, and includes an upper, reserve buoyancy tank T between the free flooding compartment N and the accommodation and working area. Also, the compartment N is formed with large holes in its side wall to minimise the effects of wave action. Rearrangement of the compartments also entails some relocation of the valving. An air vent hole VY' is provided in the bulkhead between tanks Y and Z and tanks X and Y each have two flooding valves VXI, VX2, and VYI, VY2 respectively.

The large reserve buoyancy tank T gives additional security against extreme conditions in which the structure might otherwise topple over or migrate to deeper water, and ensures that the working and accommodation areas are kept above water.

Figures 4, 5:
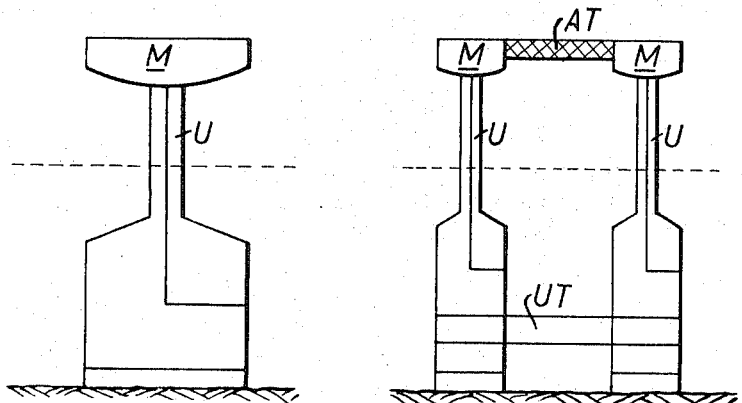
FIGS. 4 and 5 are diagrammatic views, drawn to a smaller scale of two further forms of terminal.

FIG. 4 illustrates another variant for use in deep water, say, up to 600 feet or 200 metres, and which is characterised by a relatively slender neck portion U which breaks the water surface and supports the superstructure. This narrow neck reduces the lateral loading effect of heavy surface waves.

In another variant, illustrated in FIG. 5, four vessels of the same general form as that of FIG. 4, but of reduced cross-section, are secured together on site by underwater straps or ties UT and at their upper ends by ties AT preferably forming protected cat walks between the superstructures of adjacent vessels. The individual vessels of this composite structure are towed out to the site, tilted and partially submerged, as before, prior to interconnecting them with ties UT, and are then grounded prior to interconnection by ties AT. This type of composite structure is, of course, primarily intended for use in waters where extreme wind and wave conditions are liable to occur. It could obviously be made with three vessels rather than four, if desired.

The advantages of the foregoing construction, particularly the relative cheapness of construction, ease of movement to site, stable location and possible re-floatation are of course applicable to terminal structures other than oil storage terminals, such as navigational aids to replace light-houses or light ships, breakwaters, oil tank farms, and with some modifications as supports for oil drilling rigs.

In accordance with a modification, a vessel is simply floated, towed to its site of use, flooded with water and thus grounded in its original floating attitude. This variant may be employed, for example, in very deep water, where it will be completely submerged. The vessel does not need to be internally subdivided with separate compartments.

We claim:

1. A method of oil storage in a storage terminal in the form of an elongated vessel subdivided by internal bulkheads into a plurality of separate compartments provided with flooding and venting valves comprising the steps of floating said vessel in an empty condition in a generally horizontal attitude and towing it to its site of intended use; free flooding said vessel with seawater by sequential operation of the said valves to flood said compartments successively, beginning at one of its ends to bring said vessel to a generally vertical attitude; further flooding said vessel causing it to sink and settle on the sea-bed with one said one end resting on said sea-bed; and at least partially filling said vessel with oil, with concomitant displacement of seawater from the interior of said vessel, said vessel remaining grounded by virtue of its own weight and ballast.

2. An oil storage or similar terminal for use at sea in the form of an elongated closed vessel of rectangular cross-section having transverse internal bulkheads defining a plurality of separate compartments, and provided with flooding and venting valves for the controlled free-flooding of different compartments in sequence from one end of said vessel to the other, the arrangement being such that said vesel can be floated in a generally horizontal attitude for towing, and flooded to a generally vertical attitude for grounding in the vertical attitude, to form a free standing storage vessel with one of its ends held down on the sea bed by the weight and ballast of said vessel.

3. A storage terminal according to claim 2 further comprising a superstructure at the upper end of the vessel serving in use to provide an accommodation and- /or working area above the water line of the grounded vessel.

4. A storage terminal according to claim 2, comprising a plurality of said vessels securely connected together to form a composite structure in which said vessels are disposed parallel with and spaced from each other.

5. A storage terminal according to claim 2, wherein said vessel is ballasted assymmetrically at its lower end, with a greater part of the ballast weight on one side of a plane containing the longitudinal axis of the vessel, and has a compensating buoyancy compartment near the upper end of the vessel lying on the same side of the said plane.

6. An oil storage or similar terminal for use at sea in the form of an elongated vessel having a rectangular transverse cross-section and transversely divided into a plurality of compartments, each compartment being provided with valve means for permitting the introduction of sea water and the displacement of air from said compartment individually whereby said compartments may be flooded successively from one end of said vessel to the other, one of said ends being provided with an integral base portion which supports said vessel in a stationary position on the sea bed when said vessel is fully flooded.

\* \* \* \* \*